US008387420B2

(12) United States Patent
Kawabata et al.

(10) Patent No.: US 8,387,420 B2
(45) Date of Patent: Mar. 5, 2013

(54) DRUM TYPE WASHING MACHINE

(75) Inventors: Shinichiro Kawabata, Tokyo (JP);
Yoshinori Kaneda, Tokyo (JP)

(73) Assignees: Kabushiki Kaisha Toshiba, Tokyo (JP);
Toshiba Consumer Electronics Holdings Corporation, Tokyo (JP);
Toshiba Home Appliances Corporation, Tokyo (JP)

( * ) Notice: Subject to any disclaimer, the term of this patent is extended or adjusted under 35 U.S.C. 154(b) by 0 days.

(21) Appl. No.: 13/198,502

(22) Filed: Aug. 4, 2011

(65) Prior Publication Data

US 2011/0289981 A1 Dec. 1, 2011

Related U.S. Application Data

(63) Continuation of application No. PCT/JP2010/051401, filed on Feb. 2, 2010.

(30) Foreign Application Priority Data

Feb. 13, 2009 (JP) ................... 2009-031223

(51) Int. Cl.
*D06F 37/20* (2006.01)
*F16F 15/03* (2006.01)
(52) U.S. Cl. ............. 68/12.06; 68/23.1; 188/267.2
(58) Field of Classification Search .......... 68/12.02, 68/12.06, 23 R, 23.1, 23.3; 188/267, 267.1, 188/267.2
See application file for complete search history.

(56) References Cited

U.S. PATENT DOCUMENTS

| 5,284,330 | A | | 2/1994 | Carlson |
|---|---|---|---|---|
| 6,151,930 | A | * | 11/2000 | Carlson .............. 68/12.06 |
| 6,202,806 | B1 | * | 3/2001 | Sandrin et al. ......... 188/267.1 |
| 6,340,080 | B1 | | 1/2002 | Carlson |
| 6,394,239 | B1 | * | 5/2002 | Carlson ............... 188/267.2 |
| 6,471,018 | B1 | * | 10/2002 | Gordaninejad et al. ... 188/267.1 |
| 6,974,000 | B2 | * | 12/2005 | Carlson et al. .......... 188/267.2 |
| 7,412,852 | B2 | * | 8/2008 | Park et al. ............... 68/12.06 |
| 7,510,060 | B2 | * | 3/2009 | Izawa et al. ............ 188/267 |
| 7,530,243 | B2 | * | 5/2009 | Matsushima et al. ...... 68/12.04 |
| 7,530,244 | B2 | * | 5/2009 | Inuzuka et al. ......... 68/24 |

(Continued)

FOREIGN PATENT DOCUMENTS

| JP | 63-125243 | 8/1988 |
|---|---|---|
| JP | 8-19687 | 1/1996 |

(Continued)

OTHER PUBLICATIONS

International Search Report issued in PCT/JP2010/051401 on Mar. 9, 2010.

(Continued)

*Primary Examiner* — Joseph L Perrin
(74) *Attorney, Agent, or Firm* — DLA Piper LLP (US)

(57) ABSTRACT

A drum type washing machine having a suspension supporting a water tub in a vibration isolated manner and including a cylinder, a magnetic field generator fixed in the cylinder, a pair of magnetic members located at both axial sides of the field generator respectively, a smart fluid including a magneto-rheological fluid retained on an inner surface of the generator, a sealing member which is fixed in the cylinder so as to be located below the generator to prevent leakage of the smart fluid so that the smart fluid is retained, and a shaft which is supported so as to be axially reciprocable relatively along the generator, magnetic members, smart fluid, and sealing member such that reciprocation of the shaft does not substantially displace the smart fluid. The generator generates a magnetic circuit including the cylinder and the shaft.

12 Claims, 8 Drawing Sheets

U.S. PATENT DOCUMENTS

| | | | |
|---|---|---|---|
| 2003/0071238 A1* | 4/2003 | Kintz et al. | 252/62.52 |
| 2003/0075401 A1* | 4/2003 | Carlson | 188/267 |
| 2004/0231374 A1* | 11/2004 | Chang et al. | 68/23.3 |
| 2005/0188472 A1* | 9/2005 | Park et al. | 8/158 |
| 2005/0211517 A1* | 9/2005 | Carlson | 188/267 |
| 2006/0006027 A1* | 1/2006 | Carlson et al. | 188/267.2 |

FOREIGN PATENT DOCUMENTS

| | | |
|---|---|---|
| JP | 2002-502942 | 1/2002 |
| JP | 2005-245578 | 9/2005 |
| JP | 2005-291338 | 10/2005 |
| JP | 2006-057766 | 3/2006 |
| WO | WO 99/22162 | 5/1999 |

OTHER PUBLICATIONS

English Language Abstract of JP 2005-245578 published Sep. 15, 2005.

English Language Translation of JP 2005-245578 published Sep. 15, 2005.

English Language Abstract of JP 2002-502942 Published Jan. 29, 2002.

English Language Translation of JP 2002-502942 Published Jan. 29, 2002.

English Language Abstract of JP 8-19687 Published on Jan. 23, 1996.

English Language Translation of JP 8-19687 Published on Jan. 23, 1996.

English Language Abstract of JP 2005-291338 published on Oct. 20, 2005.

English Language Translation of JP 2005-291338 published on Oct. 20, 2005.

Chinese Office Action issued in CN 201080007543.6 on Jul. 4, 2012.

English Language Translation of Chinese Office Action issued in CN 201080007543.6 on Jul. 4, 2012.

Japanese Office Action issued in JP 2009-031223 on Apr. 26, 2012.

English Language Translation of Japanese Office Action issued in JP 2009-031223 on Apr. 26, 2012.

English Language Abstract of JP 2006-057766 published on Mar. 2, 2006.

English Language Translation of JP 2000-057766 published on Mar. 2, 2006.

English Language Abstract of JP 63-125243 published Aug. 16, 1988.

Taiwanese Office Action issed in TW 099104177 on Nov. 9, 2012.

English Language Translation of Taiwanese Office Action issed in TW 099104177 on Nov. 9, 2012.

Korean Office Action issued in KR 2011-7028238 on Dec. 12, 2012.

English Language Translation of Korean Office Action issued in KR 2011-7028238 on Dec. 12, 2012.

* cited by examiner

DRUM TYPE WASHING MACHINE

CROSS-REFERENCE TO RELATED APPLICATIONS

This application is a continuation application of International Application No. PCT/JP2010/051401, filed Feb. 2, 2010, which, in turn, claims the benefit of priority from Japanese Patent Application No. 2009-031223 filed Feb. 13, 2009, the disclosures of which are incorporated herein by reference in their entireties.

FIELD

Embodiments described herein relate to a drum type washing machine in which a water tub is supported in a vibration isolated manner by suspensions using a smart fluid.

BACKGROUND

Conventional drum type washing machines comprise a drum which accommodates laundry and is provided in a water tub for storing washing liquid so that the drum is rotatable about a horizontal axis. The water tub is supported by a plurality of suspensions on a bottom plate of a casing in the drum type washing machine, whereby vibration is reduced during an operation. A suspension of the above-described type is known which uses as a working fluid a magneto-rheological fluid (hereinafter, "MR fluid") which changes a viscosity according to the strength of a magnetic field.

One of conventional suspensions using the MR fluid includes a damper tube into which a piston rod is inserted and two pistons occupying two axial positions with respect to the piston rod respectively. An MR fluid accommodating chamber is defined between the pistons in the damper tube. The damper tube has a part that faces the MR fluid accommodating chamber and is provided with a magnetic generator. The MR fluid accommodating chamber is divided by the magnetic generator into two axial chambers. More specifically, the two divided chambers of the MR fluid accommodating chamber are provided at axial both sides of the magnetic generator respectively. The MR fluid fills both divided chambers.

The magnetic generator comprises an annular iron core on which a coil is wound so that magnetic field is caused. The magnetic generator and the piston rod form an MR fluid path therebetween. The drum type washing machine further comprises a damper tube side spring bracket mounted on a damper tube end where the piston rod protrudes. The piston rod has a protruding end on which a shaft side spring bracket is mounted. A coil spring is interposed between these spring brackets. The water tub is thus supported in the casing by the suspensions each of which uses the MR fluid.

When the water tub is vibrated vertically in the above-described water tub supporting construction, the damper tube is also reciprocated vertically or axially together with the water tub with expansion and contraction of the coil spring. In this case, the piston is reciprocated vertically relative to the MR fluid accommodating chamber in the damper tube. With the reciprocal movement of the piston, the MR fluid reciprocally flows through the MR fluid path between the divided axial chambers of the MR fluid accommodating chamber. The MR fluid then generates a damping force due to the viscosity thereof.

Upon energization of the coil of the magnetic generator, magnetic field is imparted to the MR fluid, thereby increasing the viscosity of the MR fluid. As a result, a frictional loss is increased when the MR fluid passes through the MR fluid path, whereupon the damping force is increased. In other words, the damping force can be adjusted by energizing the coil of the magnetic generator.

DETAILED DESCRIPTION

In general, according to one embodiment, a drum type washing machine has a suspension supporting a water tub in a vibration isolated manner, and the water tub accommodates a drum. The suspension includes a cylinder and a magnetic field generator fixed in the cylinder and generating a magnetic field in a variable manner. A pair of magnetic members are provided at both axial sides of the magnetic field generator respectively. A smart fluid includes a magneto-rheological fluid retained on an inner surface of the magnetic field generator. A sealing member is fixed in the cylinder so as to be located below the magnetic field generator to thereby prevent leakage of the smart fluid so that the smart fluid is retained. A shaft is supported so as to be axially reciprocable relatively along the magnetic field generator, the magnetic members, the smart fluid, and the sealing member such that reciprocation of the shaft does not substantially displace the smart fluid. The magnetic field generator generates a magnetic circuit including the cylinder and the shaft.

First Embodiment

Figure 3:
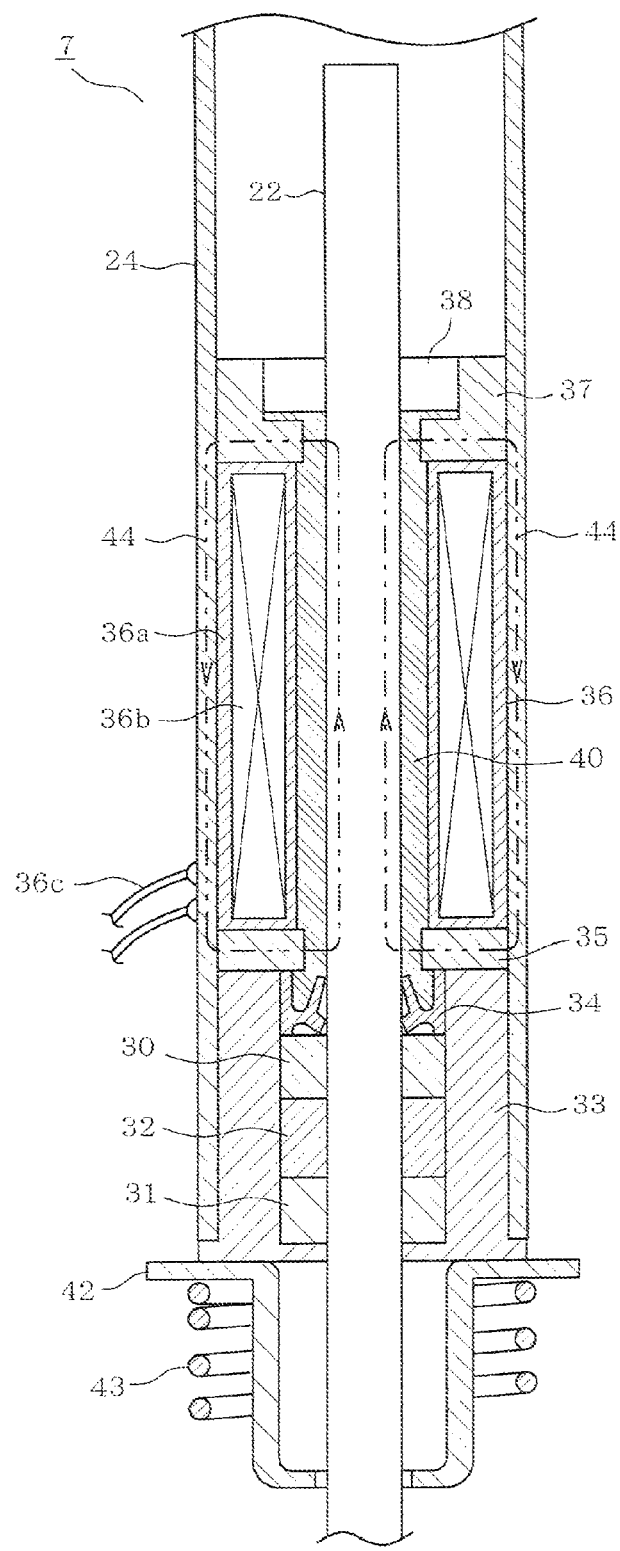
FIG. 3 is a partially enlarged longitudinal section of the suspension, showing the operation of the suspension.
Figure 4:
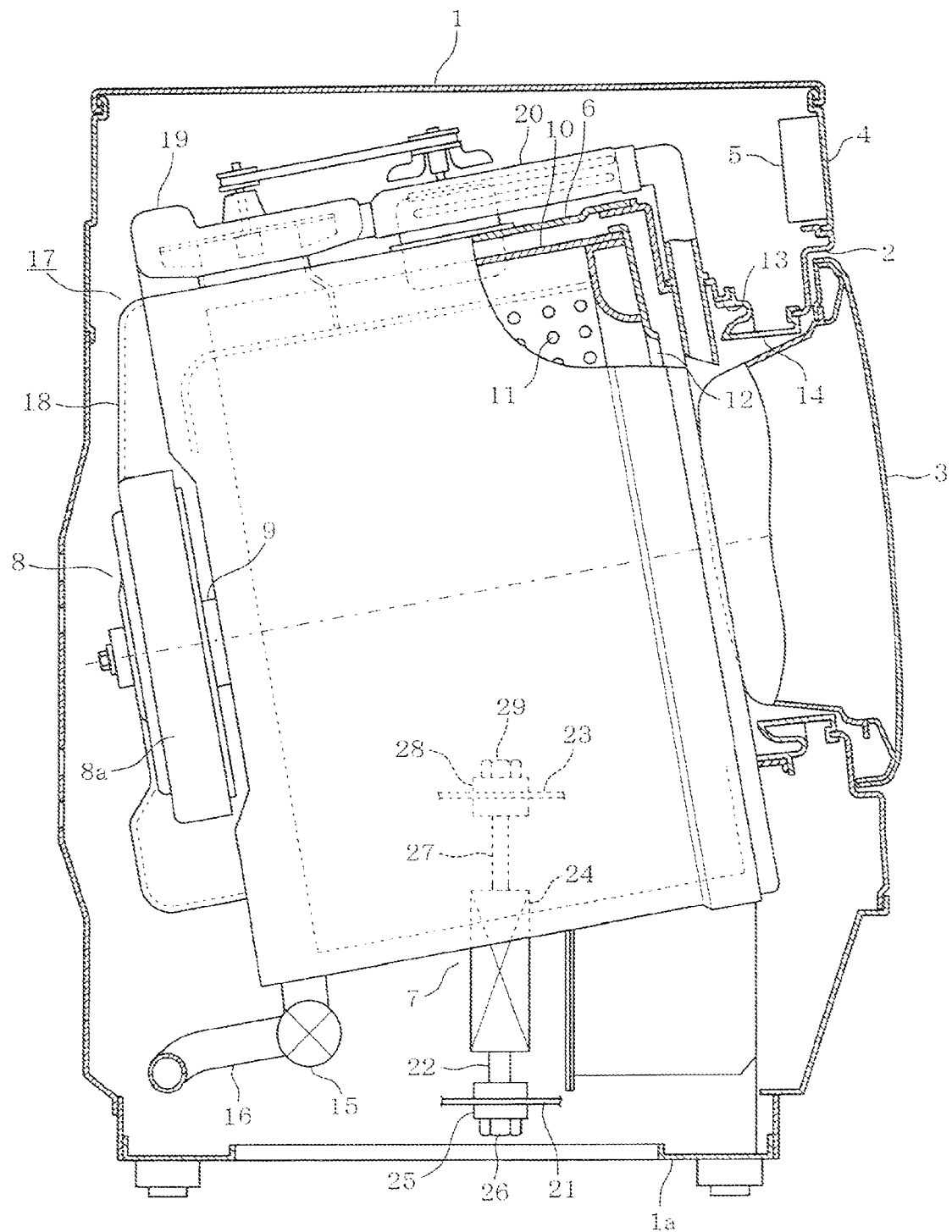
FIG. 4 is a longitudinal section of an overall drum type washing machine.

A first embodiment will be described with reference to FIGS. 1 to 4. FIG. 4 illustrates an overall structure of the drum type washing machine. The drum type washing machine includes a casing 1 serving as an outer envelope. The casing 1 has a front (the right side as viewed in FIG. 4) formed with a centrally located access opening 2. A door 3 is mounted on the front of the casing 1 to open and close the access opening 2. An operation panel 4 is mounted on the upper front of the casing 1. A control device 5 for operation control is provided in the back of the operation panel 4 (inside the casing 1).

The water tub 6 is mounted within the casing 1 and formed into the shape of a cylinder having a horizontal axis directed substantially in the front-rear direction (in the right-left direction as viewed in FIG. 4). The water tub 6 is elastically supported on a bottom plate 1a of the casing 1 by a pair of right and left suspensions 7 so as to be inclined frontwardly upward. Only one of the suspensions 7 is shown in FIG. 4. The structure of the suspension 7 will be described in detail later.

An electric motor 8 is mounted on a rear of the water tub 6. The motor 8 comprises a brushless DC motor of the outer rotor type, for example. The motor 8 includes a rotor 8a and a rotating shaft (not shown) which is mounted on a central part of the rotor 8*a* and inserted through a bearing bracket 9 into the interior of the water tub 6. A drum 10 is mounted within the water tub 6. The drum 10 is also formed into the shape of a cylinder having a horizontal axis directed substantially in the front-rear direction. The drum 10 has a rear center mounted to a distal end of the rotating shaft of the motor 8, whereby the drum 10 is supported so as to be inclined frontwardly upward in the same manner as the water tub 6. The drum 10 is adapted to be rotated by the motor 8. Accordingly, the drum 10 serves as a rotating tub, and the motor 8 serves as a drum drive device rotating the drum 10.

The drum 10 has a large number of small holes 11 formed substantially through an overall circumferential wall thereof. Only a part of the holes 11 are shown in FIG. 4. The drum 10 further has an opening 12 formed in the front thereof, and the water tub 6 also has an opening 13 formed in the front thereof. The access opening 2 is continuous via an annular bellows 14 to the opening 13 of the water tub 6. As a result, the access opening 2 is continuous to an interior of the drum 10 via the bellows 14, the opening 13 of the water tub 6 and the opening 12 of the drum 10.

A draining conduit 16 is connected via a drain valve 15 to the rear bottom of the water tub 6 which is a lowest part thereof. A drying unit 17 extends upward from the rear of the water tub 6 and then frontward. The drying unit 17 includes a dehumidifier 18, a blower 19 and a heater 20. The drying unit 17 dehumidifies and then heats air in the water tub 6, circulating the air to dry laundry.

Figure 1:
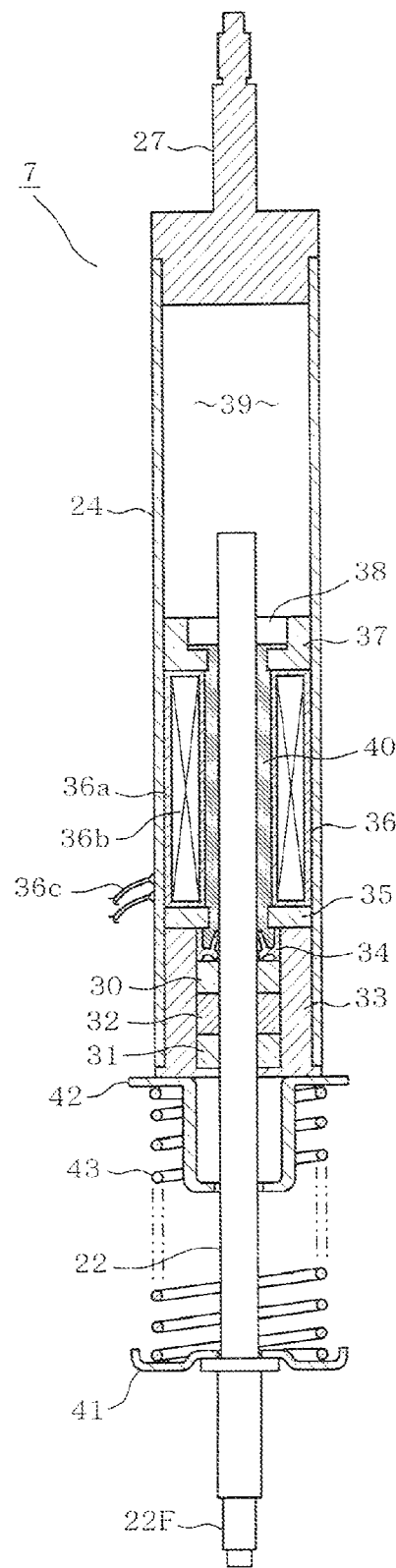
FIG. 1 is a longitudinal section of a suspension according to a first embodiment, showing the state before actuation thereof.

The structure of the suspension 7 will now be described in detail. The suspension 7 includes a shaft 22 mounted on a mounting plate 21 further mounted on the bottom plate 1*a* of the casing 1 and a cylinder 24 mounted on a mounting plate 23 of the water tub 6. More specifically, the shaft 22 has a connection 22F formed on a lower end thereof as shown in FIG. 1. The connection 22F is fixed via an elastic seat plate 25 (see FIG. 4) such as rubber to the mounting plate 21 of the bottom plate 1*a* by a nut 26, whereby the shaft 22 is mounted on the mounting plate 21.

Figure 2:
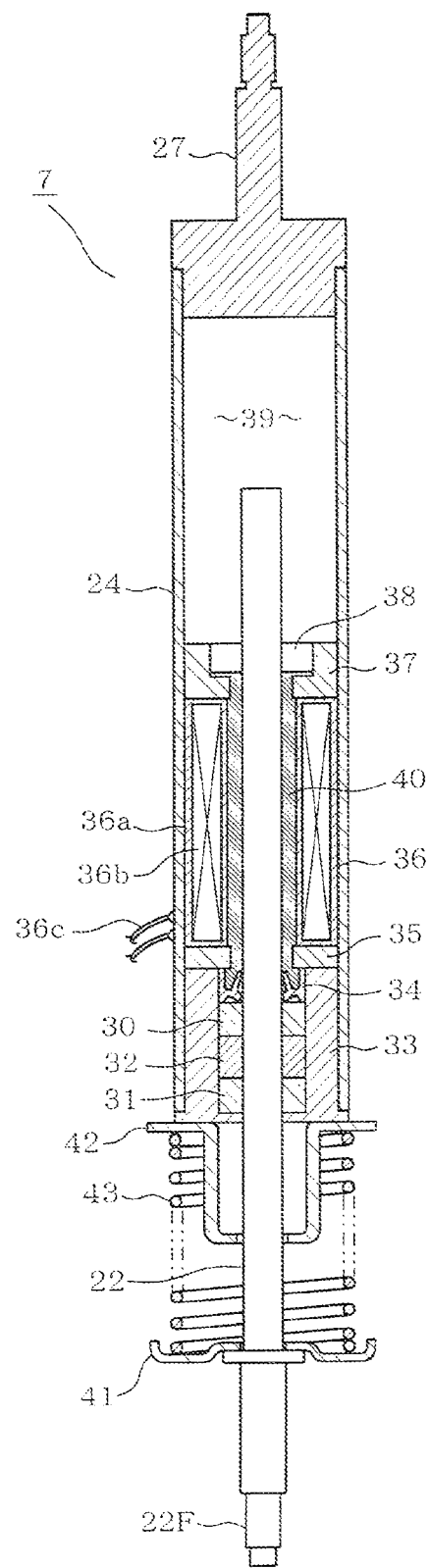
FIG. 2 is a longitudinal section of the suspension in the state during operation.

A connecting member 27 is mounted on an upper end of the cylinder 24 as shown in FIGS. 1, 2 and 4. The connecting member 27 is fixed also via an elastic seat plate 28 or the like to the mounting plate 23 of the water tub 6 by a nut 29, whereby the cylinder 24 is configured to be vibrated upward and downward (axially) or vertically together with the water tub 6. A bearing housing 33 is press-fitted into a lower interior of the cylinder 24. The bearing housing 33 houses two bearings 30 and 31 both of which are disposed therein so as to be spaced from each other by a spacer 32 interposed therebetween so that the bearings 30 and 31 occupy upper and lower positions in the bearing housing 33 respectively. Each of the bearings 30 and 31 is made of an oil-impregnated sintered metal (bearing alloy) and fixed in the cylinder 24 together with the spacer 32 and the bearing housing 33. An annular lip-shaped sealing member 34 is fixedly mounted on a top of the interior of the bearing housing 33.

A lower yoke 35 serving as a ring-like magnetic member is press-fitted into the cylinder 24 so as to be located above the sealing member 34, thereby being fixedly mounted. Furthermore, a field generator 36 is press-fitted into the cylinder 24 so as to be located above the lower yoke 35, thereby being fixedly mounted in the cylinder 24. The field generator 36 includes a bobbin 36*a* and a coil 36*b* wound on the bobbin 36*a*. The coil 36*b* is energized via a lead wire 36*c* drawn out of the cylinder 24. An upper yoke 37 is also formed into the ring-like magnetic member in the same manner as the lower yoke 35. The upper yoke 37 is press-fitted into the cylinder 24 so as to be located above the field generator 36, thereby being fixedly mounted in the cylinder 24. The upper yoke 37 has a larger axial dimension (thickness) than the lower yoke 35 and includes a dent 38 formed about the upper center thereof. The cylinder 24 includes a portion thereof located above the upper yoke 37. A cavity 39 is defined by the portion of the cylinder 24 and the connecting member 27.

The shaft 22 has an upper portion extending through the bearing 31, the spacer 32, the bearing 30 the sealing member 34, the lower yoke 35, the field generator 36 (the bobbin 36*a*) and the upper yoke 37 so that the shaft 22 is axially reciprocable relative to these components, reaching an interior of the cavity 39. In this state, the whole shaft 22 is supported on the bearings 30 and 31. Furthermore, the sealing member 34 is located below the lower yoke 35 and the field generator 36 and is in close contact with the circumferential surface of the shaft 22. A predetermined gap is defined between the shaft 22 and the field generator 36 (the bobbin 36*a*) and further between the shaft 22 and the lower and upper yokes 35 and 37. The gap is filled with a smart fluid (a magneto-rheological (MR) fluid 40 in this case). The sealing member 34 is adapted to prevent the MR fluid 40 from leaking.

The smart fluid is a fluid whose rheological properties such as viscosity can be changed by controlling a physical amount externally applied thereto. The smart fluid includes the MR fluid 40 and an electro-rheological fluid (not shown) both serving as a fluid having a viscosity that changes by application of electrical energy. In the embodiment, the MR fluid 40 is used as the smart fluid and changes a viscosity thereof according to magnetic field intensity. An electro-rheological fluid (ER fluid) may be used as the smart fluid, instead and changes a viscosity thereof according to electric field intensity. The MR fluid 40 comprises ferromagnetic particles (iron, iron carbonyl, etc.) dispersed in oil, for example. When magnetic field is applied to the MR fluid 40, the ferromagnetic particles form chain clusters, whereupon an apparent viscosity thereof is increased.

An electro-rheological fluid is generally classified into a dispersion system and a homogeneous system. A dispersive electro-rheological fluid is a fluid in which inductive particles are dispersed in an insulating oil. When electrical field is applied to the dispersive particles, inductive particles form chain clusters (a bridge formed by inductive particles continuing in the electrostatic direction. Consequently, an apparent viscosity is increased in the dispersive electro-rheological fluid.

Particles constituting the electro-rheological fluid are oriented by electrical field in a homogeneous electro-rheological fluid. This increases an apparent viscosity in the homogeneous electro-rheological fluid.

The field generator 36 generates magnetic field according to the value of current flowing into the coil 36*b* thereby to control the viscosity of the MR fluid 40. The generated magnetic field can be varied by the current value, whereby a variable control of the viscosity of the MR fluid 40 is realized. A shaft-side spring seat 41 has a hole (not shown) through which the shaft 22 is inserted. The spring seat 41 is fixed at a lower portion of the shaft 22. A cylinder-side spring seat 42 is joined and fixed to a lower end of the cylinder 24 so as to be spaced from and opposed to the shaft-side spring seat 41. The shaft 22 is inserted through a hole (not shown) of the spring seat 42 so that the spring seat 42 is axially reciprocable relative to the shaft 22. A coil spring 43 comprising a compression coil spring is provided between the spring seats 41 and 42 so as to surround the shaft 22 and the cylinder-side swivel plate 4 and so as to be telescopic. Consequently, the suspensions 7 are built between the water tub 6 and the bottom plate 1a of the casing 1 so as to support the water tub 6 in a vibration isolated manner above the bottom plate 1a of the casing 1.

The drum type washing machine having the above-described construction will work as follows. The drum 10 accommodating laundry is rotated when the operation of the control device 5 starts based on the operation of the operation panel 4 by the user. The water tub 6 is vibrated mainly upward and downward with rotation of the drum 10. In response to the telescopic vibration of the water tub 6, the cylinder 24 connected integrally to the water tub 6 is vibrated upward and downward around the shaft 22 with the components (including the connecting member 27, upper yoke 37, field generator 36, lower yoke 35, sealing member 34, bearing 30, spacer 32, bearing 31, bearing housing 33 and cylinder-side spring seat 42) while the coil spring 43 is contracted and expanded or telescopically moved. FIG. 2 shows a state of the suspension 7 during the operation of the washing machine. In FIG. 2, together with the aforesaid components, the cylinder 24 is located lower than in FIG. 1 showing the state thereof before start of the operation.

The MR fluid 40 fills the gap between the shaft 22 and the magnetic field generator 36 and the gap between the shaft 22 and the lower and upper yokes 35 and 37, as described above. When the cylinder 24 is vibrated upward and downward together with the aforesaid components as described above, the MR fluid 40 imparts a damping force due to frictional resistance caused by the viscosity thereof, reducing the vibration amplitude of the water tub 6. In this case, upon energization of the coil 36b of the field generator 36, magnetic field is produced such that the magnetic field is applied to the MR fluid 40. As a result, the viscosity of the MR fluid 40 is increased. FIG. 3 shows the state of the system 7 in the case where the viscosity of the MR fluid 40 is increased. Since the coil 36b of the field generator 36 has been energized, a magnetic circuit 44 is established by the shaft 22, the MR fluid 40, the upper yoke 37, the cylinder 24, the lower yoke 35, the MR fluid 40 and the shaft 22. The viscosity is increased in part of the MR fluid 40 through which the magnetic flux passes. In particular, the viscosity is largely increased in the MR fluid 40 located between the shaft 22 having a high flux density and the upper yoke 37 and between the lower yoke 35 and the shaft 22, whereupon the frictional resistance thereof is increased to a large degree. As a result, the frictional resistance is increased when the cylinder 24 is vibrated upward and downward together with the aforesaid components (particularly, the field generator 36 and the upper and lower yokes 37 and 35), whereupon the damping force is increased.

Regarding the control of damping force against the upward and downward movement of the water tub 6, displacement of the water tub 6 and force transmission to the bottom plate 1a can be prevented by controlling the damping force so that the damping force is increased at the time of start-up when resonance of the water tub 6 appears. Furthermore, the damping force is controlled so as to be reduced when the drum 10 is rotated at higher speeds after having passed a resonance point, whereupon force transmission to the bottom plate 1a can be reduced during high-speed rotation.

According to the above-described drum type washing machine, the coil 36b of the field generator 36 is energized so that the viscosity of the MR fluid 40 is changed, whereby the damping force can be controlled. In this configuration, the sealing member 34 is fixed so as to be located lower than the field generator 36 disposed in the cylinder 24. The sealing member 34 is brought into close contact with the outer circumference of the shaft 22 to prevent leakage of the MR fluid 40. Accordingly, the MR fluid 40 is used to fill only the gap defined between the field generator 36 and the shaft 22 and the gap located near the former gap and defined between the shaft 22 and the lower and upper yokes 35 and 37, whereby the water tub 6 can be supported in the vibration isolated manner. Accordingly, the drum type washing machine of the embodiment can prevent use of a large amount of MR fluid 40, differing from the conventional drum type washing machines. Consequently, the MR fluid 40 can be reduced by a large amount, and the costs of the suspension and accordingly of the drum type washing machine can be reduced.

Furthermore, the field generator 36 is configured as the magnetic field generator. The lower and upper yokes 35 and 37 both serving as the magnetic members are disposed at both axial sides of the field generator 35 respectively. The MR fluid 40 fills the gap between the upper yoke 37 and the shaft 22 and the gap between the lower yoke 35 and the shaft 22. As a result, the density of magnetic flux passing through the MR fluid 40 is increased such that the viscosity of the MR fluid 40 can be increased to a large degree, which results in a larger damping force, as described above.

FIGS. 5 to 8 illustrate second to fifth embodiments respectively. Identical or similar parts in the second to fifth embodiments are labeled by the same reference symbols as those in the first embodiment. The description of these parts will be eliminated and the following will describe only the differences between the first embodiment and each of the second to fifth embodiments.

Second Embodiment

Figure 5:
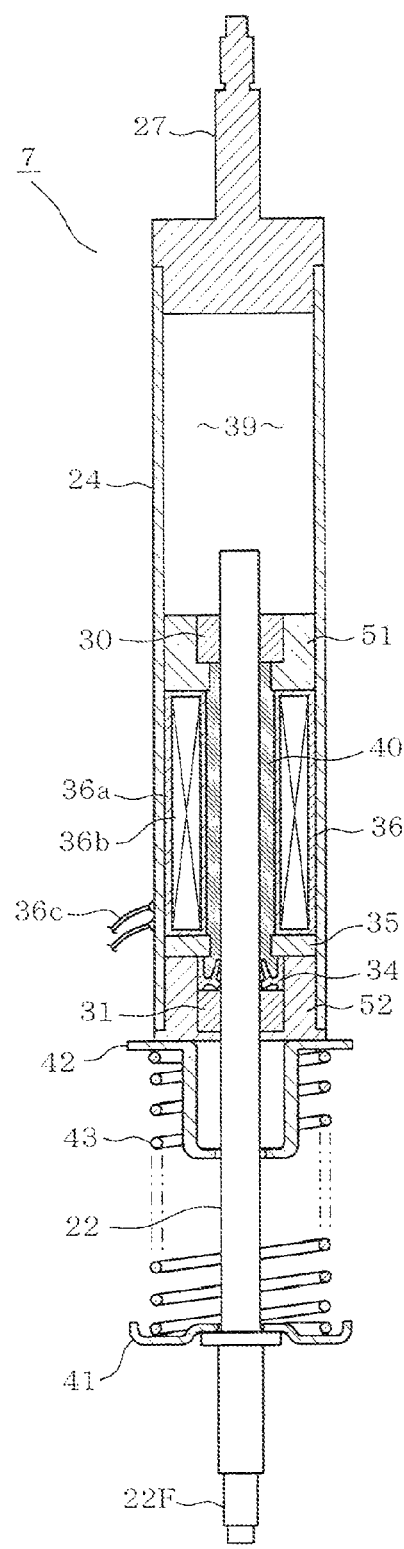
FIG. 5 is a view similar to FIG. 1, showing a second embodiment.

FIG. 5 shows the second embodiment in which the bearing 30 is housed in the upper yoke 51 so as to be located above the field generator 36. The upper yoke 51 employed in the second embodiment has a larger axial length than the upper yoke 37 employed in the first embodiment. The bearing 31 is housed in the bearing housing 52 together with the sealing member 34 so as to be located below the field generator 36. The bearing housing 52 has a larger axial length than the bearing housing 33 in the first embodiment. More specifically, the bearings 30 and 31 are disposed at both axial sides of the field generator 36 respectively.

As the result of the above-described construction, the tilt of the shaft 22 can be reduced since a long distance is ensured between the bearings 30 and 31. Furthermore, the above-described construction can reduce differences in the damping force resulting from differences in the gap between the shaft 22 and the field generator 36 filled by the MR fluid 40, the gap between the shaft 22 and the upper yoke 37 and the gap between the shaft 22 and the lower yoke 35.

The drum type washing machine of the second embodiment can work in the same manner as in the first embodiment and achieves the same advantages as those in the first embodiment. More specifically, the drum 10 accommodating laundry is rotated upon start of the operation of the control device 5. With this, the water tub 6 is vibrated mainly upward and downward. Each suspension 7 is responsive to the upward and downward vibration of the water tub 6, whereby the cylinder 24 coupled integrally to the water tub 6 is vibrated upward and downward around the shaft 22 together with the various components (the connecting member 27, the bearing 30, the upper yoke 51, the field generator 36, the lower yoke 35, the sealing member 34, the bearing 31, the bearing housing 52 and the cylinder-side spring seat 42) while the coil spring 43 is contracted and expanded.

The MR fluid 40 fills the first gap between the shaft 22 and the field generator 36, the second gap which is located near the first gap and defined between the shaft 22 and the lower yoke 35 and the third gap which is located near the first gap and defined between the shaft 22 and the upper yoke 51.

When the cylinder 24 is vibrated upward and downward with the various components as described above, the MR fluid 40 imparts a damping force caused by the frictional resistance due to the viscosity thereof, thereby damping the vibration amplitude of the water tub 6.

When the coil 36b of the field generator 36 is energized in this case, magnetic fields are generated to be imparted to the MR fluid 40, which increases the viscosity thereof. As the result of energization of the coil 36b of the field generator 36, a magnetic circuit (not shown) is established which comprises the shaft 22, the MR fluid 40, the upper yoke 51, the cylinder 24, the lower yoke 35, the MR fluid 40 and the shaft 22. When the magnetic flux passes through part of the MR fluid 40, the viscosity is increased in the part of the MR fluid 40. The viscosity of the MR fluid 40 is increased to a large degree particularly in the gaps between the shaft 22 and the upper yoke 51 and between the lower yoke 35 and the shaft 22, in both of which gaps the magnetic flux density is higher. Consequently, the frictional resistance is increased when the cylinder 24 is vibrated upward and downward together with the components (particularly, the field generator 36, the lower yoke 35 and the upper yoke 51), whereby the damping force is increased.

The damping force relative to the upward and downward vibration of the water tub 6 is controlled to be increased during a startup time when the resonance of the water tub 6 appears. This can reduce the displacement of the water tub 6 and force transmitted to the bottom plate 1a. Furthermore, the damping force is controlled so as to be reduced during high-speed rotation of the drum 10 after the drum 10 has passed a resonance point. This can reduce force transmission to the bottom plate 1a during high-speed rotation.

The coil 36b of the field generator 36 is thus energized so that the viscosity of the MR fluid 40 is changed, whereby the damping force can be controlled. In this case, the sealing member 34 is fixed so as to be located lower than the field generator 36 within the cylinder 24. The sealing member 34 is in close contact with the outer circumference of the shaft 22 so as to prevent leak of the MR fluid 40. Accordingly, the MR fluid 40 is used to fill only three gaps, that is, the first gap between the shaft 22 and the field generator 36, the second gap which is located near the first gap and defined between the shaft 22 and the lower yoke 35 and the third gap which is located near the first gap and defined between the shaft 22 and the upper yoke 51. Consequently, the water tub 6 can be supported in the vibration isolated manner in the drum type washing machine of the second embodiment. Thus, differing from the conventional construction, the construction of the second embodiment can prevent use of a large amount of the MR fluid 40, whereby the amount of MR fluid 40 to be used can sufficiently be reduced. This can reduce the cost of the suspension 7 and accordingly the cost of the drum type washing machine.

Additionally, the field generator 36 is configured as the magnetic field generator in the drum type washing machine of the second embodiment. The upper and lower yokes 51 and 35 both serving as magnetic members are disposed at both axial sides of the magnetic field generator respectively. The MR fluid 40 fills the gap between the upper yoke 51 and the shaft 22 and the gap between the lower yoke 35 and the shaft 22. This can increase the density of magnetic flux passing through the MR fluid 40 as described above, resulting in an increase in the viscosity of the MR fluid 40 to a large degree and the achievement of a large damping force.

Third Embodiment

Figure 6:
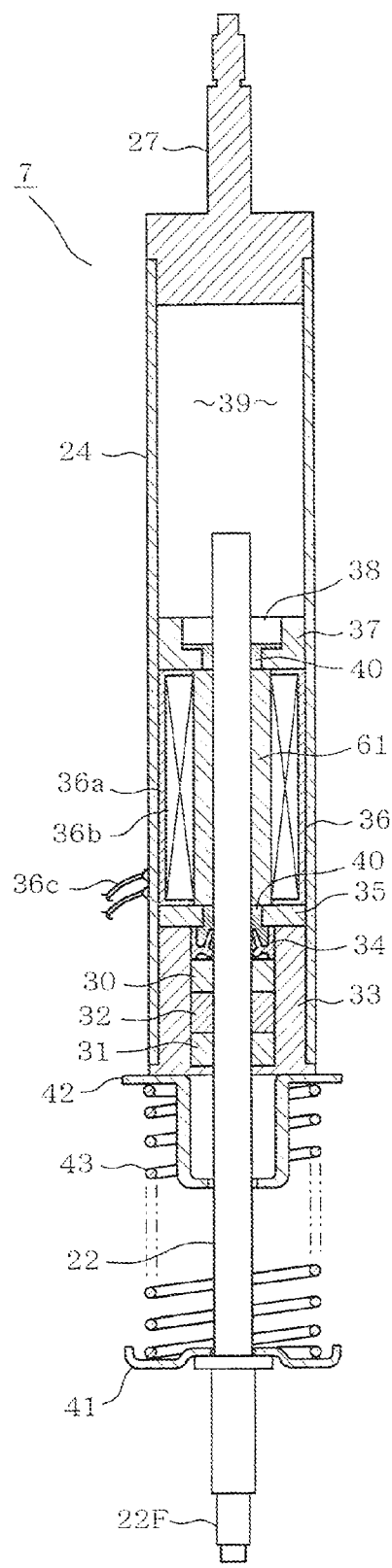
FIG. 6 is a view similar to FIG. 1, showing a third embodiment.

FIG. 6 shows a third embodiment in which a spacer 61 is provided in a space defined between the field generator 36 and the shaft 22 so as to extend the entire distance between the lower and upper yokes 35 and 37 both serving as the magnetic members.

The viscosity of the MR fluid 40 becomes highest in the gap between the shaft 22 and the upper yoke 37 and the gap between the shaft 22 and the lower yoke 35, as described above. These gaps have respective higher rates of contribution to the increase in the damping force. On the contrary, the remaining space has a lower rate of contribution to the increase in the damping force. Accordingly, the spacer 61 is provided between the field generator 36 and the shaft 22 so as to extend the entire distance between the upper and lower yokes 37 and 35, whereby the use of the MR fluid 40 can be restricted to the gap between the upper yoke 37 and the shaft 22 and the gap between the lower yoke 35 and the shaft 22. Consequently, the amount of MR fluid 40 to be used can further be reduced. Alternatively, the spacer 61 may be provided between the field generator 36 and the shaft 22 so as to extend part of the distance between the lower and upper yokes 35 and 37, instead.

Fourth Embodiment

Figure 7:
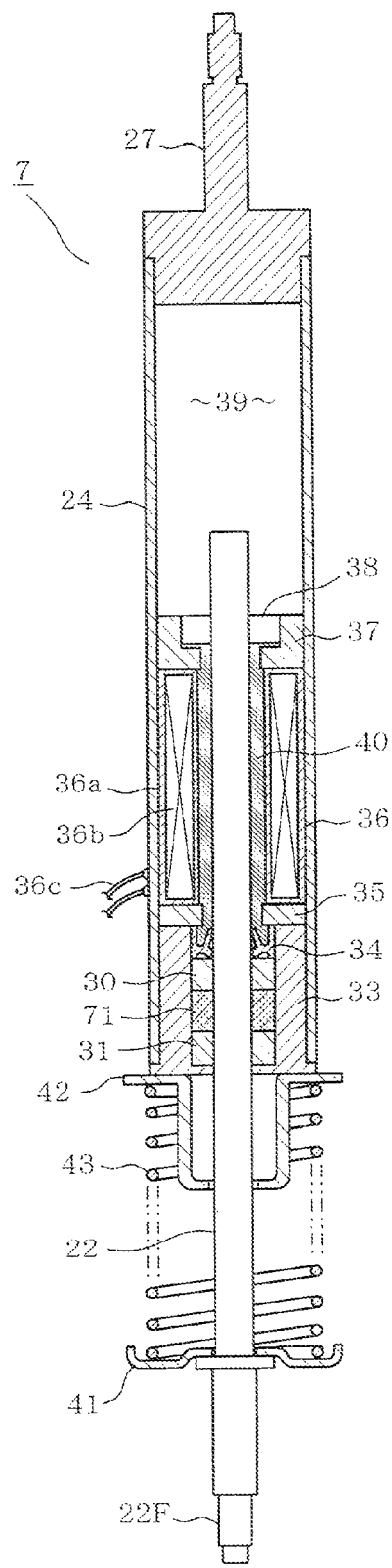
FIG. 7 is a view similar to FIG. 1, showing a fourth embodiment.

FIG. 7 shows a fourth embodiment in which a damping member 71 imparting a damping force to the axially reciprocable shaft 22 which is provided between the bearings 30 and 31 so as to be located at one of two axial sides of the field generator 36. The damping member 71 is a cylindrical member made of an ethylene propylene diene Monomer (EPDM) rubber that is a friction material and an elastic material, for example. The damping member 71 has an inner diameter smaller than an outer diameter of the shaft 22. The damping member 71 has an inner circumferential surface in close contact with the outer circumferential surface of the shaft 22.

As the result of the above-described construction, the damping member 71 imparts a frictional force (Coulomb friction), whereupon a damping force is generated. Accordingly, the coil 36b of the field generator 36 need not be energized normally at the startup time of the dehydrating operation. Only when the vibration of the water tub 6 is large (at the time of resonance or the like), the coil 36b is energized so that the viscosity of the MR fluid. 40 is increased thereby to increase the damping force. Consequently, the durability of the suspension 7 can be improved since an energization time of the coil 36b is reduced.

Two damping members 71 may be provided at both axial sides of the field generator 36 respectively, instead of one axial side, whereupon a larger damping force can be obtained.

Fifth Embodiment

Figure 8:
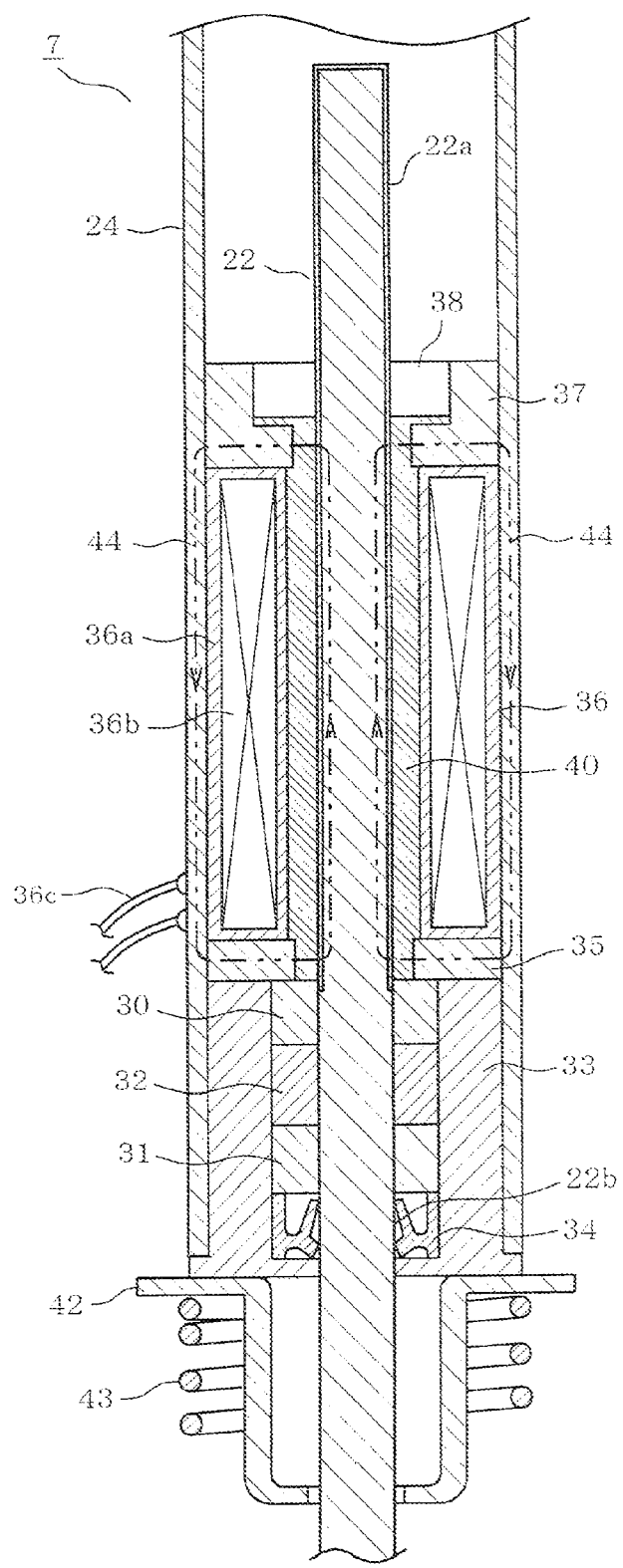
FIG. 8 is a view similar to FIG. 3, showing a fifth embodiment.

FIG. 8 illustrates a fifth embodiment in which the sealing member 34 is disposed below the bearing 31, the spacer 32 and the bearing 31. The shaft 22 includes a part 22a which is reciprocated relative to the field generator 36 (magnetic field generator) and which is magnetized and another part 22b which is reciprocated relative to the sealing member 34 and which is unmagnetized. In this case, the magnetized part 22a of the shaft 22 is realized by covering the surface of the shaft 22 made of an unmagnetized metal such as aluminum with a magnetic material. The unmagnetized part 22b of the shaft 22 is realized by exposing the surface of the shaft 22.

As the result of the above-described construction, the magnetized part 22a (the part reciprocated relative to the field generator 36) of the shaft 22 forms the magnetic circuit 44 which causes magnetic flux to pass through the shaft 22 in the above-described mariner. Furthermore, while the magnetic circuit 44 is being formed, the MR fluid 40 is prevented from adhering to the surface of the shaft 22 by the magnetism having leaked from the magnetic circuit 44, at the side of the unmagnetized part 22b (the part reciprocated relative to the sealing member 34) of the shaft 22. Consequently, the damping force can be maintained against the upward and downward vibration of the water tub 6 since the MR fluid 40 is prevented from leaking from the sealing member 34 bit by bit.
Other Embodiments The shaft 22 and either one or both of the upper and lower yokes 37 and 35 may be magnetized beforehand although this is not shown in the drawings. As a result, the magnetic force of the shaft 22 and the yokes 37 and/or 35 causes the MR fluid 40 to remain in an initially filled state between the shaft 22 and the upper yoke 37 and/or between the shaft 22 and the lower yoke 35. Accordingly, the MR fluid 40 is prevented from leaking from the location where the MR fluid 40 has initially filled even when the suspension 7 falls over sideways turns upside down during transportation thereof or assembly of the washing machine. Accordingly, an initial performance of the MR fluid 40 can be obtained satisfactorily.

In the aforementioned case, the field generator 36 comprising the magnetic field generator may be configured to be energized from an electric cell to generate magnetic field for the shaft 22 and either one or both of the upper and lower yokes 37 and 35, instead of magnetizing the shaft 22 and either one or both of the upper and lower yokes 37 and 35. This modification can achieve the same advantages as those of the foregoing embodiments.

Furthermore, an electrical circuit energizing the coil 36b of the field generator 36 may be provided with a switch for changing the direction of energization so that the direction of the magnetic flux of the magnetic field can be changed. As the result of this configuration, the direction of the magnetic flux of the magnetic field can be changed by changing the energization direction of the coil 36b. Consequently, an unintended magnetization can be prevented from occurring in the aforementioned components on which the magnetic circuit 44 is formed. This can avoid the variations in the damping force.

Each suspension may comprise a cylinder, an electric field generator which is fixed in the cylinder and variably generates an electric field, a shaft supported so as to extend through the electric field generator and so as to be axially reciprocable relative to the electric field generator, a smart fluid comprising an electro-rheological fluid filling the gap between the shaft and the electric field generator, and a sealing member which is fixed in the cylinder so as to be located below the electric field generator, the sealing member being in close contact with an outer circumferential surface of the shaft to prevent the smart fluid from leaking. More specifically, the electric field generator is used as the field generator, and the electrorheological fluid is used as the smart fluid.

The aforementioned electric field generator may be configured as follows. An electrode is disposed in the cylinder so as to be spaced from the outer circumferential surface of the shaft. The electro-rheological fluid fills a space between the electrode and the shaft. Voltage of several kilovolts is to be applied to the electrode, for example. More specifically, a capacitor (the electrode) is disposed in the cylinder, and the electro-rheological fluid fills an interior of the capacitor.

An electro-rheological fluid of the disperse system is suitable as the electro-rheological fluid. The electro-rheological fluid of the disperse system is more analogous with the magneto-rheological fluid in the function and property than a homogeneous electro-rheological fluid. Thus, the foregoing embodiments should not be restrictive but may be modified without departing from the scope of the appended claims.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A drum type washing machine having a suspension supporting a water tub in a vibration isolated manner, the water tub accommodating a drum, the suspension comprising:
    a cylinder;
    a magnetic field generator fixed in the cylinder and generating a magnetic field in a variable manner;
    a pair of magnetic members provided at both axial sides of the magnetic field generator respectively;
    a smart fluid including a magneto-rheological fluid retained on an inner surface of the magnetic field generator;
    a sealing member which is fixed in the cylinder so as to be located below the magnetic field generator, thereby preventing leakage of the smart fluid so that the smart fluid is retained; and
    a shaft which is supported so as to be axially reciprocable relatively along the magnetic field generator, the magnetic members, the smart fluid, and the sealing member such that reciprocation of the shaft does not substantially displace the smart fluid:
    wherein the magnetic field generator generates a magnetic circuit including the cylinder and the shaft.

2. The machine according to claim 1, further comprising a bearing which is fixed in the cylinder to support the shaft so that the shaft is axially reciprocable.

3. The machine according to claim 2, wherein the bearing is located lower than the magnetic field generator, and the sealing member is located lower than the magnetic field generator and higher than the bearing.

4. The machine according to claim 2, wherein the bearing includes a bearing disposed at each opposite axial end of the magnetic field generator respectively.

5. The machine according to claim 2, wherein the bearing includes two bearings disposed at one axial side of the magnetic field generator, the machine further comprising a damping member provided between the bearings for imparting a damping force to the shaft in axial reciprocation.

6. The machine according to claim 1, further comprising a spacer provided in a space between the magnetic filed generator and the shaft, said spacer extending an entirety or a part of a space between the magnetic members.

7. The machine according to claim 1, wherein the shaft and both or either one of the magnetic members is magnetized.

8. The machine according to claim 1, wherein the magnetic field generator is capable of generating magnetic field for the shaft and both or either one of the magnetic members by an electric cell.

9. The machine according to claim 1, further comprising a damping member provided in at least one axial side of the magnetic field generator for imparting a damping force to the shaft in the axial reciprocation.

10. The machine according to claim 1, wherein the shaft includes a magnetic part reciprocated relative to the magnetic field generator and a non-magnetic part reciprocated relative to the sealing member.

11. The machine according to claim 1, wherein the magnetic field generator is configured to change a direction of magnetic flux of the magnetic field.

12. A drum type washing machine having a suspension supporting a water tub in a vibration isolated manner, the water tub accommodating a drum, wherein the suspension comprises:
- a cylinder;
- an electric field generator fixed in the cylinder and generating an electric field in a variable manner;
- a smart fluid including an electric-rheological fluid retained on an inner surface of the magnetic field generator
- a sealing member which is fixed in the cylinder so as to be located below the electric field generator, thereby preventing leakage of the smart fluid so that the smart fluid is retained; and
- a shaft which is supported so as to be axially reciprocable relatively along the magnetic field generator, the magnetic members, the smart fluid, and the sealing member such that reciprocation of the shaft does not substantially displace the smart fluid.

\* \* \* \* \*